Jan. 17, 1961    R. D. WELLES    2,968,341
UNDERSEAT COMPARTMENT
Filed Sept. 11, 1958    2 Sheets-Sheet 1
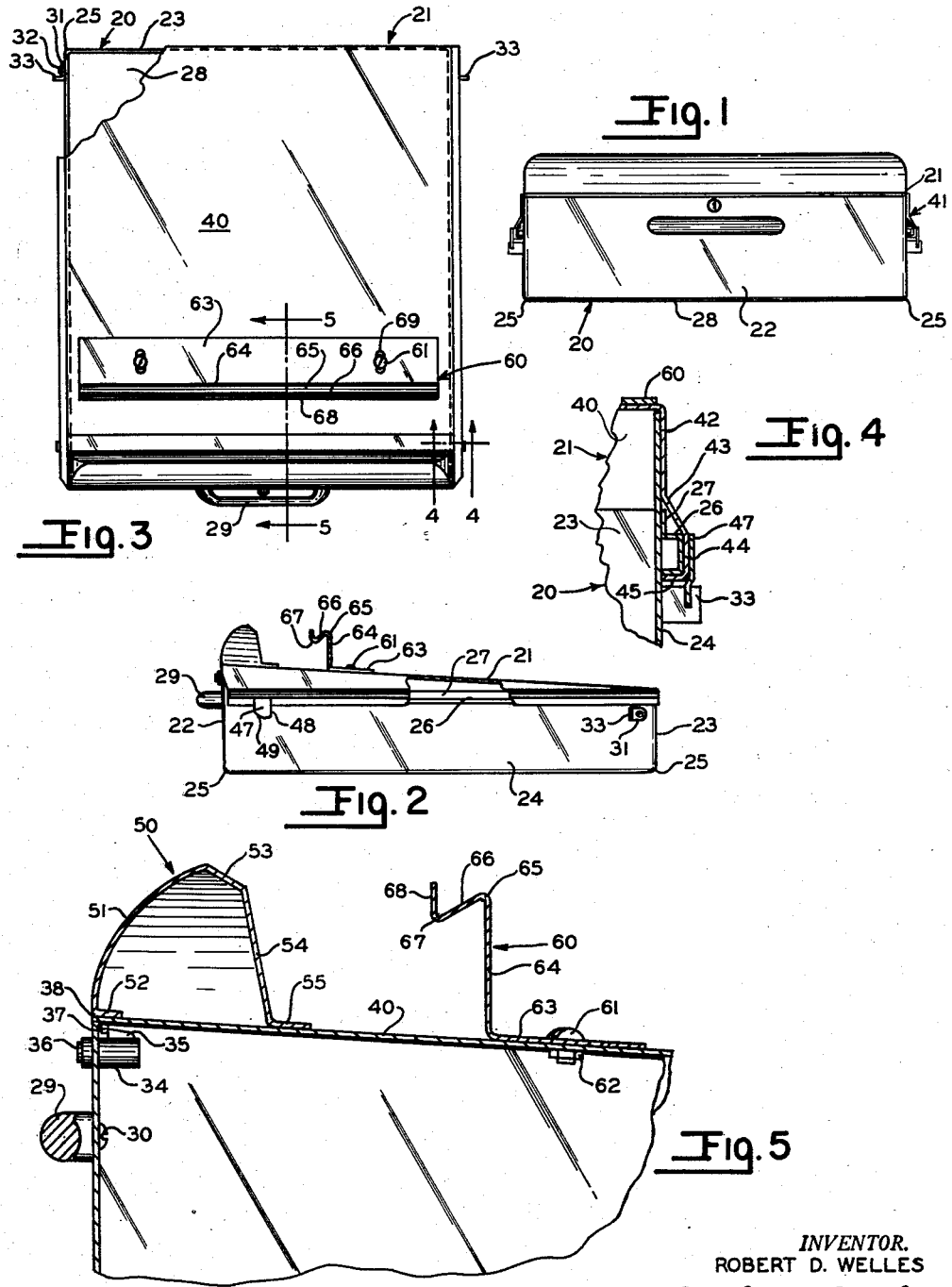
INVENTOR.
ROBERT D. WELLES
BY Jugelter & Jugelter
Attys.

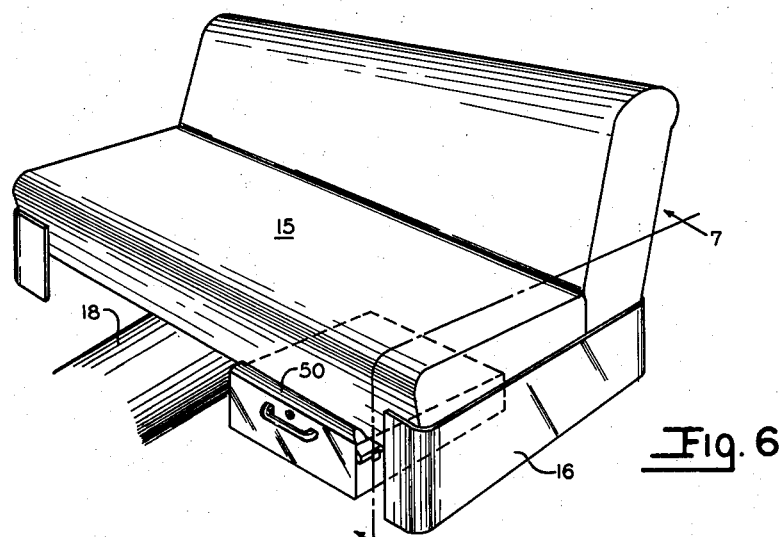
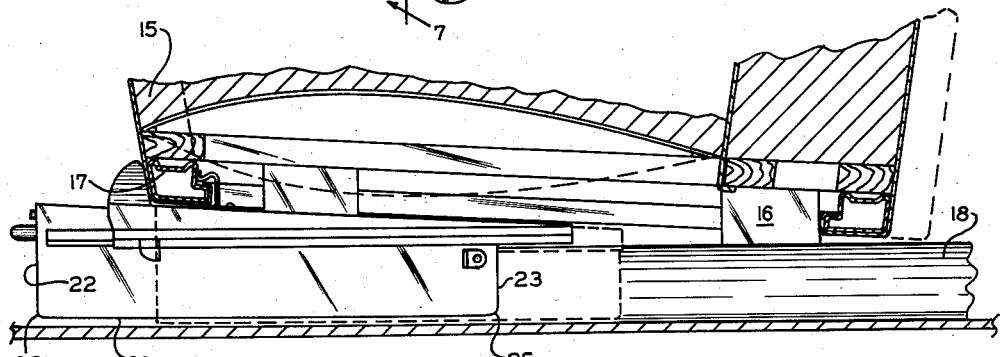
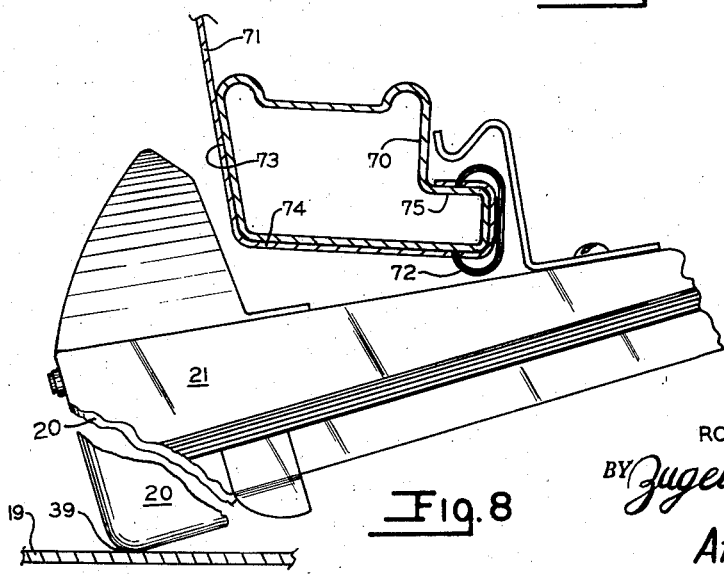
INVENTOR.
ROBERT D. WELLES

United States Patent Office 2,968,341
Patented Jan. 17, 1961

2,968,341

UNDERSEAT COMPARTMENT

Robert D. Welles, Sycamore Township, Hamilton County, Ohio, assignor, by mesne assignments, to Textron, Inc., Providence, R.I., a corporation of Rhode Island Filed Sept. 11, 1958, Ser. No. 760,507

6 Claims. (Cl. 155—188)

This invention relates to an automobile accessory and more particularly to an underseat compartment for an automobile.

An object of this invention is to provide an underseat compartment for an automobile.

Another object of this invention is to provide an underseat compartment for an automobile which is secured to and supported by the seat frame in such manner that it does not interfere with normal functioning of the seat.

Another object of this invention is to provide an underseat compartment of the above character for safely containing and safe guarding miscellaneous articles.

Another object of this invention is to provide an underseat compartment of the above character which may be quickly and easily secured in place in integral relation with and beneath the front seat of an automobile without modification of the automobile.

Another object of this invention is to provide an underseat compartment of the above character which, when installed, closed, and locked, is such an integrated part of the automobile as to offer great resistance to pilferage and theft of the contents thereof.

Another object of this invention is to provide an underseat compartment of the above character which, when installed, closed, and locked, can not be removed except by doing substantial physical damage to the accessory, or adjacent portions of the automobile, or both.

Another object of this invention is to provide a device of the above character which, when locked, may be opened, disassembled, and completely removed from an automobile in which it is installed, without tools or damage to any part of the underseat compartment or automobile.

Another object of this invention is to provide an underseat compartment of the above character which is easily opened and closed, the interior of which is spacious and conveniently accessible.

A further object of this invention is to provide an underseat compartment of the above character which may be closed and locked so as to remain safely and securely in place during emergencies and yet having a drawer portion which may be easily opened and also removed for cleaning.

A further object of this invention is to provide an underseat compartment of the above character which is of simple, sturdy construction adapted to give long trouble-free service but which is easily manufactured and saleable at reasonable prices.

A further object of this invention is to provide an underseat compartment comprising a cover having a top bounded by a front edge, a pair of parallel depending side flanges and a depending rear flange, the side flanges being formed to define a pair of opposed grooves, a bracket secured to the top of the cover in spaced parallel relation to the front edge thereof, said bracket extending upwardly and forwardly to a free edge and being adapted to hang on a portion of an automobile seat frame, a front support secured to the top of the cover adjacent the front edge thereof and in spaced parallel relation to the bracket, said bracket supporting said cover beneath an automobile seat and said front support co-operating with the frame of said seat to preclude disengagement of said bracket from the frame of said seat and to index said cover in a position in which the flange defined grooves extend lengthwise of the automobile spaced from and substantially parallel to the floor thereof, a drawer, parallel outwardly extending guide members secured to the drawer and adapted for being co-operatively received for sliding movement in said flange-defined grooves, whereby said drawer may be suspended in close spaced relation to the floor of an automobile, a lock bolt adapted to secure said drawer in fixed relation to said cover and being releasable when desired, stop means secured to said cover, clip means secured to said drawer and adapted to engage said stop means to preclude separation of said drawer and cover, said clip means being retractable to non-co-operative relation to said stop means whereby said drawer may be separated from said cover.

The above and other objects and features of this invention will in part be obvious and will in part be apparent to those having ordinary skill in the art to which this invention pertains, from the following description, the accompanying drawings, and the appended claims.

In the drawings:

Fig. 1 is a view in front elevation of an underseat compartment automobile accessory embodying my invention in what presently appears to be a preferred form thereof;

Fig. 2 is a view in side elevation of the device illustrated in Fig. 1, a portion thereof being broken away to more clearly illustrate details of construction;

Fig. 3 is a top plan view of the device illustrated in Figs. 1 and 2, a portion thereof being broken away to more clearly illustrate details of construction;

Fig. 4 is a fragmentary view in section taken along the line 4—4 in Fig. 3;

Fig. 5 is a fragmentary view in vertical section taken along the line 5—5 in Fig. 3;

Fig. 6 is a view in perspective of an automobile seat to and beneath which a device embodying this invention is secured;

Fig. 7 is a view in side elevation partly in section taken along the line 7—7 in Fig. 6; and Fig. 8 is a fragmentary view in side elevation illustrating the manner in which a device embodying the instant invention co-operates with a supporting portion of a seat frame and the adjacent floor of an automobile to preclude removal of the device from the automobile when the device is closed and locked.

In the drawings and the following specification, like reference characters indicate like parts.

The embodiment of the invention illustrated in the drawing is adapted to fit in subjacent relation to an automobile seat 15 between the end mounting 16 for the frame 17 of the seat and the tunnel 18, as shown in Fig. 6. The underseat compartment accessory comprises a drawer 20 and cover and mounting support therefor 21. The drawer 20 shown in the drawings comprises a substantially rectangular receptacle which may be drawn from a single piece of stock or fabricated by welding or otherwise joining a plurality of members to form a single unitary shell. As shown in the drawings, the front wall 22 of drawer 20 is higher than the rear wall 23 while the side walls 24 decrease in height from adjacent front wall 22 to rear wall 23. Thus the front and rear walls 22 and 23 are substantially rectangular in shape while the side walls 24 are trapezoidal in shape. The several edges and corners of the drawer 20 are rounded, as at 25. A respective one of a pair of guide rails 26 is permanently secured in fixed relation to the exterior face of respective side walls 24 in spaced, parallel relation to the plane of drawer bottom 28. The drawer guides 26 are preferably of flanged-channel-form in section, as shown most clearly in Fig. 4. As shown in Fig. 4, the flange portion 27 of guide 26 lies in face-to-face flat-wise abutment with drawer side wall 24 and may be secured thereto by any suitable means such as spot welds, rivets, or the like (not shown). A drawer handle 29 is secured to the front wall 22 of drawer 20 by any suitable means such as screws 30, the heads of which co-operate with the inner face of wall 22, as shown in Fig. 5. A pair of stop clips 31 are respectively secured to the side walls 24 adjacent rear wall 23 by means such as rivets 32. As shown in the drawings, stop clips 31 comprise angle-shaped members, one arm or tab-like portion of which lies in flatwise face-to-face abutment with side wall 24 while stop tab or arm 33 projects perpendicularly from side wall 24. The stop clips 31 are secured snugly against side wall 24 by rivets 32 in order that frictional engagement between the clip and side wall results in substantial frictional resistance to pivoting of the clip 31 with reference to rivet 32. However, the magnitude of frictional resistance is such as will permit manual pivotal manipulation of the clip as will be explained subsequently herein. The drawer 20 is completed by a latch or lock 34 mounted in wall 22, which latch, as shown most clearly in Fig. 5, may have a spring-biased bolt 35 retractable by actuation of push button 36 or by cam co-operation of bolt 35 with a keeper 37 integral with or firmly secured to the cover 21. The push button 36 may include a lock cylinder such that it may be immobilized or disconnected from spring latch bolt when it is desired that the drawer 20 be locked.

Cover 21 has a substantially rectangular flat top portion 40 of substantially the same size and shape as the open, upper face of drawer 20. A pair of lateral flanges 41 depend from cover top portion 40. The lateral flanges 41, as shown in Figs. 2 and 4, comprise a substantially vertical portion 42 in close spaced relation to drawer side wall 24. Portion 42 is of generally triangular configuration. A rectangular portion 43 extends from the lower extremity of portion 42 downwardly and away from the vertical side wall 24 of drawer 20. A second rectangular portion 44 of the lateral flange 41 extends vertically downwardly from the lower extremity of inclined or sloping portion 43 thereof and is joined to a rectangular portion 45 which extends perpendicularly toward the plane of portion 42 extended. As shown most clearly in Fig. 4, portions 43, 44 and 45 of flange 41 define a groove adapted to receive and house a drawer guide rail 26. Portions 44 and 45 of lateral flange 41 are adapted for abutting and sliding co-operation with adjacent portions of guide rail 26 lying in face-to-face relation therewith. As shown in Fig. 1, flanges 41 are formed symmetrically and define opposed grooves. Thus, the portions 44 of lateral flanges 41 serve to substantially preclude lateral movement of drawer 20 with relation to cover 21, while the flanges 45 thereof co-operate with the under side of guide rails 26 to support the drawer 20 in predetermined, elevational relation to the cover 21. A pair of stops 47 may be secured to the exterior face of each lateral flange 41 and extend below portion 45 thereof adjacent but spaced from the front end thereof as shown in Figs. 1, 2, 3, 4, 6 and 7. The stops 47 have a vertically extending rear edge 48 adapted to co-operate with stop tab portion 33 of clip 31 to establish a predetermined limit for relative movement of drawer 20 relative to cover 21 that is to the left of the position in which it is shown in Fig. 2, to preclude separation of the drawer 20 from the cover 21. The lower forward edge 49 is preferably of cam form adapted to urge clip 31 to swing in a counter-clockwise direction about rivet 32 from a position such as it is shown in Fig. 2 into a position in which stop pad portion 33 thereof will pass from left to right beneath stop 47 shown in Fig. 2 incident to initial placing of drawer 20 in co-operative relation to cover 21. Thereafter, the clip 31 may be swung to the position in which it is illustrated in Fig. 2, to preclude withdrawal of the drawer 20 from engagement with the cover 21. The edge 48 will co-operate with tab portion 33 of clip 31 to swing the clip into proper alignment, that is, a position corresponding to Fig. 2, when preliminary hand positioning of the clips 31 is inexact.

In order to facilitate mounting of the underseat compartment in co-operative relation to an automobile seat 15, a front support member 50 is provided and secured to cover top portion 40 adjacent the front edge 38 thereof. Front support 50, as shown, comprises an upper forward, rounded portion 51 along the lower extremity of which a rearwardly projecting flange 52 is provided and from the upper extremity of which an upper downwardly and rearwardly sloping portion 53 extends to a lower sharply downwardly and rearwardly sloping portion 54, the lower extremity of which joins flange portion 55. The front support 50 is secured in fixed relation to top portion 40 of cover 21 by any suitable means, such as welding, rivets, or the like, serving to secure flanges 52 and 55 in predetermined, spaced relation to each other and in flatwise, abutting, fixed relation to top portion 40. Thus, as shown most clearly in Figs. 6 and 7, front support 50 is so formed that portion 54 thereof lies in face-to-face co-operative abutment with the lower front portion of automobile seat 15, while portion 51 thereof serves to provide a mounted nosing or filler between the seat cushion and the forwardly projecting portion of cover top portion 40.

As shown clearly in Figs. 2, 3, and 5, a bracket 60 is provided and secured in fixed relation to cover top portion 40 by suitable means, such as screws 61 which co-operate with nuts 62. The bracket 60 is a unitary member having a foot flange 63 adapted to be clamped in face-to-face engagement with top cover portion 40 by screws 61. Bracket 60 extends in substantially parallel spaced relation to front support 50 as shown in Fig. 3. Slots 69 are provided in foot flange 63 for screws 61 to permit alteration in the spacing of bracket 60 and front support 50 to compensate for effective frame thickness variations due to seat covers or the like not shown. Riser portion 64 extends integrally upwardly from the forward edge of foot flange 63 to a knee bend 65 from which bend, portion 66 extends forwardly and downwardly to elbow bend 67 from which front flange 68 extends upwardly.

Cover 21 may be mounted in co-operative relation to a portion of an automobile seat frame, as shown most clearly in Figs. 6, 7, and 8. In Figs. 7 and 8 a portion of one conventional automobile seat frame construction 17 is illustrated. The front bottom rail 70 for the seat is a hollow metal member. The seat covering upholstery material 71 extends down the front face 73 of member 70, thence rearwardly along the under face 74 of member 70 and is wrapped up and over the lower, rearwardly projecting flange portion 75 of member 70. The upholstery fabric 71 is secured in place by means such as hog rings 72 each of which anchors the fabric to the frame member 70 at two points. A plurality of hog rings 72 suitably spaced at intervals along the length of the flange portion 75 of frame member 70 are of course provided. Installation of the underseat compartment illustrated in the drawings may be effected by releasing latch 34 to retract slide bolt 35 from engagement with keeper 37, followed by shifting of drawer 20 to the left of the position in which it is shown relative to cover 21 in Fig. 2, clip 31 being swung into the position indicated in order that the drawer 20 may be completely disengaged from cover 21. Cover 21 is then grasped by the front edge and front support portion thereof. The rear edge of cover 21 is inserted beneath automobile seat 15 until front flange 63 of bracket 60 is rearwardly of frame member 70, that is, to the right of frame member 70 as viewed in Figs. 7 and 8. Upper sloping portion 53 of front support member will then be subjacent to face 74. Cover 21 is then tilted to raise the rear edge thereof until bracket portions 66, 67 and 68 can be advanced forwardly to hook over or on top of flange 75 with riser portion 64 abutting hog rings 72. The elbow bend portion 67 is lowered to rest upon the upper surface of the flange 75 adjacent the portion of the frame 70 which rises upwardly therefrom. Cover 21 is then permitted to swing in a clockwise direction, as viewed in Figs. 7 and 8, until the face of portion 54 moves into position pressing covering 71 toward forward face 73 of frame 70, flange portion 55 abuts covering 71 and urges same firmly toward the under face 74 of frame member 70 adjacent the lower forward corner thereof and riser portion 64 urges hog rings 72 toward the rear edge of flange 75, thereby precluding further clockwise swinging of cover 21 from the position in which it is shown in Fig. 7. Thereafter, the drawer 20 is inserted into co-operative engagement with cover 21 with the guides 26 thereof received in the respective opposed grooves defined by lateral flanges 41 of cover 21 until clips 31 have been advanced to the right of the stop 47 as illustrated in Fig. 2. Thereafter, the clips 31 are shifted into the positions illustrated in full lines in Fig. 2 and the drawer is then moved to closed position in which it is latched by bolt 35, as illustrated in Fig. 5. When latch 34 is in latching or locked condition with bolt 35 co-operatively engaging keeper 37, drawer 20 and cover 21 are secured in unitary relation. The dimensions of the cover and drawer are such that the drawer bottom 28 is in close spaced relation to the subjacent automobile floor 19. To disengage the underseat compartment accessory from the seat frame, rotation of the drawer-cover unitary assembly in a counter-clockwise direction about the frame member 70, as viewed in Figs. 7 and 8, to an extent that front support 50 is lowered to a relative position from which it can be moved rearwardly beneath frame member 70 is necessary to disengage bracket 60 from flange 75. However, when drawer 20 and cover 21 are in co-operative engagement, as shown in Fig. 8, the lower front edge of drawer 20 engages floor 19 at 39 to preclude swinging or tilting of cover 21 into a position in which it can be disengaged from frame member 70. However, if the drawer 20 is first removed, the cover 21 can be tilted and removed in a manner substantially the reverse of the above described installation or attachment. Neither attachment or detachment requires use of tools or alteration of the automobile structure.

Having thus described the invention it will be apparent to those having ordinary skill in the art to which this invention pertains, that various changes may be made in the disclosed embodiment, without departing from either the spirit or the scope of the invention.

Therefore, what is claimed as new and desired to be secured by Letters Patent is:

1. In an automobile the combination comprising a floor, a seat frame member spaced therefrom, a cover hooked over said seat frame member from one side and abutting the opposite side so as to be disengageable therefrom only after tilting of the cover through a predetermined angle, and a drawer co-operatively engaging and removably supported by said cover in close spaced relation to said floor and adapted to cooperate with said floor to preclude tilting of said cover through the predetermined angle necessary to disengagement of the cover from said seat frame member whereby an underseat compartment may be provided.

2. An underseat compartment for a seat having a front frame face, a bottom frame face, and a shoulder frame spaced rearwardly of the front face and upwardly of the bottom face and spaced from a floor subjacent thereto, said underseat compartment comprising a main frame, a releasable drawer slidably mounted in the main frame, a hanger frame extending upwardly from the main frame, a flange on the hanger frame hangingly engageable with the shoulder frame, the main frame being adapted to swing upon the flange between an attached position in which the main frame abuts the bottom face and a released position in which the main frame is spaced below the bottom face, and a locking head mounted on the main frame and engageable with the front face when the main frame is in attached position to preclude release of the flange from the shoulder when the main frame is in attached position, the drawer, when mounted in the main frame spaced from the floor so as to engage the floor to prevent swinging of the main frame into a position in which the main frame may be detached from the seat frame upon which it hangs.

3. An underseat compartment automobile accessory comprising a substantially rectangular cover having a front edge, a top surface and drawer suspension tracks integral with depending lateral flanges thereof, a bracket secured to the top surface of the cover in spaced parallel relation to the front edge thereof and adapted to hook onto a portion of a seat frame member whereby said cover may be hung beneath said seat frame member, a front support secured integrally to the top surface of the cover adjacent the front edge thereof and in spaced relation to said bracket and adapted to co-operatively engage the lower and forward surfaces of said seat frame member to clamp same against said bracket to preclude disengagement of the bracket from said seat frame member, a drawer supported by said cover and adapted to extend into close spaced relation to the floor of an automobile, said drawer being adapted to co-operate with the cover and the floor of an automobile to preclude tilting of the cover into a position wherein the front support does not co-operate with the seat frame member so as to preclude disengagement of the bracket therefrom when said drawer is in cooperative engagement with said cover.

4. An underseat compartment for an automobile comprising a cover having a top substantially bounded by a front edge, a depending rear flange and a pair of parallel depending side flanges, the side flanges being formed to define a pair of opposed grooves, a drawer, parallel outwardly extending guide members secured to the drawer and adapted for being co-operatively received for sliding movement in said flange defined grooves, means for locking said drawer in position beneath said cover to preclude sliding relative thereto and stop means limiting sliding movement toward the opened condition so as to preclude unintentional separation of said drawer from said cover, a bracket secured to the top of the cover in spaced parallel relation to the front edge thereof, said bracket extending upwardly and forwardly to a free edge and being adapted to hang on a portion of an automobile seat frame, a front support secured to the top of the cover adjacent the front edge thereof and in spaced parallel relation to the bracket, said bracket supporting said cover beneath an automobile seat frame and said front support co-operating with the frame of said seat to preclude disengagement of said bracket from said seat frame when said drawer is in co-operative engagement with said cover.

5. An underseat compartment automobile accessory comprising a cover, a drawer slidably suspended under and in co-operative relation to said cover, said cover having a front support member adapted to cooperatively engage bottom and forward surfaces of said seat frame member, and a bracket adapted to pivot into cooperative engagement with rear and upper surfaces of said seat frame member extending transversely of an automobile to suspend said cover for cooperation with said drawer to support same in close spaced relation to the car floor, whereby said underseat compartment is biased to pivot about the line of contact of said bracket with said seat frame member and retained in co-operative supported relation to said seat frame member by co-operation of said front support member with said seat and co-operation of said drawer with the floor of said automobile to preclude removal of the underseat compartment from cooperating engagement with said seat frame while said drawer is in cooperative relation to said cover.

6. An underseat compartment automobile accessory for mounting upon at least one member of an automobile seat frame, said accessory comprising a cover, a drawer slidably suspended under and in co-operative relation to said cover, means for locking said drawer in closed relation to said cover, said cover having a front support member adapted to cooperatively engage bottom and forward surfaces of said seat frame member and a bracket adapted to pivot into cooperative engagement with rear and upper surfaces of a seat frame member of an automobile to suspend said cover for cooperation with said drawer to support same in close spaced relation to the car floor and biased to pivot about the line of contact of said bracket with said upper surface of a seat frame member in a first direction into a position in which pivoting is precluded by co-operative abutment of said front support member with said seat frame member when said compartment is in preferred relation to said automobile and pivoting of said underseat compartment in an opposite direction about said line of contact is limited by co-operation of said drawer with the car floor and cover to preclude swinging of the cover to a position in which the front support will not engage said seat frame member incident to rearward displacement of said compartment accessory.

References Cited in the file of this patent

UNITED STATES PATENTS

| | | |
|---|---|---|
| 601,744 | Wells et al. | Apr. 5, 1898 |
| 676,157 | Sparks | June 11, 1901 |
| 881,511 | Waters | Mar. 10, 1908 |
| 1,287,738 | Parrish | Dec. 17, 1918 |
| 1,600,977 | Dameron | Sept. 28, 1926 |
| 1,888,251 | Wieland | Nov. 22, 1932 |
| 2,652,887 | Fitzgerald | Sept. 22, 1953 |
| 2,748,841 | Rimkus | June 5, 1956 |
| 2,793,092 | Peterson | May 21, 1957 |